Figure 1:
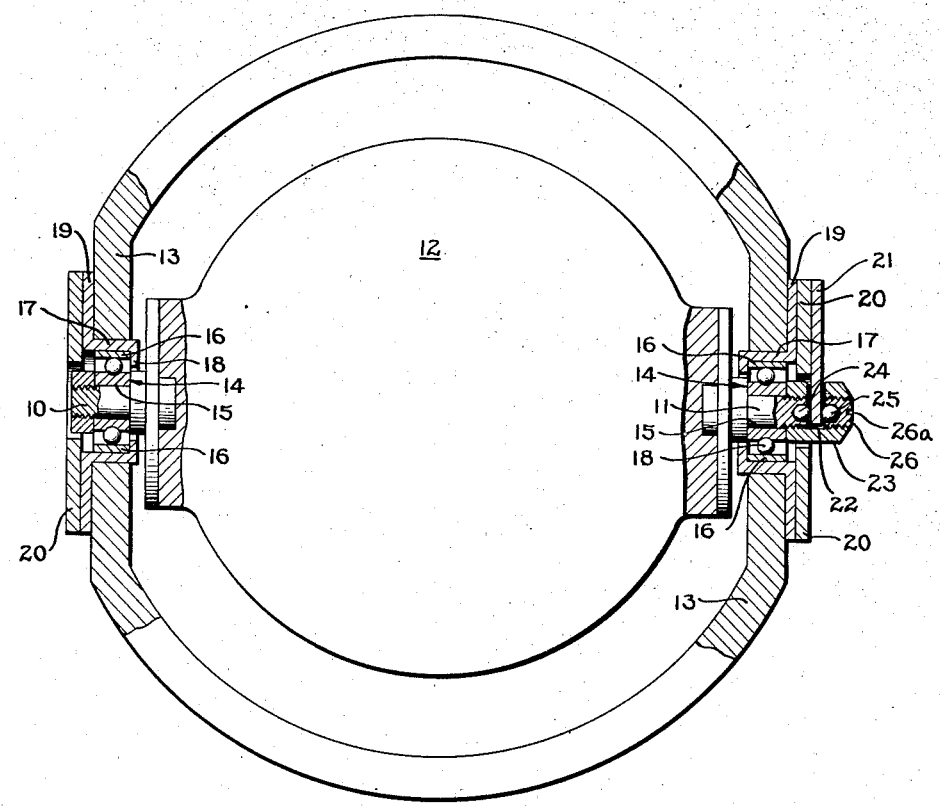

Aug. 19, 1941.   J. GOERTH   2,253,119
BEARING MEANS FOR SHAFTS
Filed July 21, 1939

INVENTOR.
Johannes Goerth
BY
Stephen Cerstvik
ATTORNEY.

Patented Aug. 19, 1941

2,253,119

UNITED STATES PATENT OFFICE 2,253,119

BEARING MEANS FOR SHAFTS

Johannes Goerth, Berlin-Grunewald, Germany, assignor to Siemens Apparate Und Maschinen Gesellschaft mit beschränkter Haftung, Berlin, Germany, a corporation of Germany Application July 21, 1939, Serial No. 285,821
In Germany January 3, 1939

2 Claims. (Cl. 308—174)

This invention relates to means for supporting shafts, and more particularly to ball bearing arrangements for the shafts or trunnions of devices such as gyroscopes.

In devices which have heretofore been proposed of this character, the races between which the balls have been disposed have had guide tracks or grooves therein. When axial forces arise either in one or the other direction, a jamming may easily occur, as a result of the stresses between the balls and corresponding bearing surfaces or tracks. Consequently friction losses in the bearing may be comparatively high and unavoidable.

One of the objects of the present invention is to provide a novel bearing arrangement in which friction losses are reduced to a minimum.

Another object is to provide a bearing arrangement which governs the axial movement of a shaft in a novel manner.

A further object is to provide a bearing arrangement of the above character which is light in weight and simple in construction.

The above and further objects and novel features will more fully appear from the detailed description when the same is read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the several views—

Figure 2:
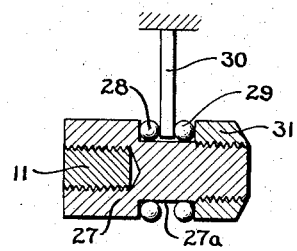

Fig. 1 is a top plan view, partly in section and with parts broken away, of one embodiment of the invention; and, Fig. 2 is a detail sectional view of a portion of a second embodiment of the invention.

The forms of the invention illustrated in the accompanying drawing, by way of example, comprise a bearing arrangement for the trunnions of a gyro rotor housing and is constituted by two ball bearings, one for each trunnion, each bearing being adapted for absorbing radial thrust only and therefore permitting axial movement of the trunnions. The forces or thrusts acting axially of the trunnions are absorbed by a single axial bearing in which balls are preferably employed.

In the form shown in Fig. 1, bearing means are provided for trunnions 10 and 11 of a gyro rotor housing 12, the trunnions resting upon a conventional gimbal frame 13. The bearings are constituted by radial thrust members 14 having inner and outer ball races 15 and 16 respectively. Races 15 are mounted upon the trunnions 10 and 11 and rotate therewith. In order to reduce friction losses and to prevent jamming of the balls in the races upon the occurrence of axial thrusts, the ball races are adapted for permitting free axial movement of the trunnions therein. Therefore one of the ball races, for example race 16, is provided with a smooth and continuous cylindrical surface. The other race is provided with a suitable guide groove for maintaining the balls in proper alignment within the races.

In order that the ball bearings may be easily extracted, the outer races thereof are mounted within sleeves 17 having retaining flanges 18 and outer face flanges 19. Cover plates 20 are also provided, for example, for protecting the bearings from dirt and dust.

Novel means are provided in combination with the above bearings for absorbing forces acting axially of the trunnions either to the right or to the left as viewed in Fig. 1, comprising a thrust absorbing arm 21 which in the form shown is fixedly mounted relative to the trunnions, preferably upon the frame member 13. Arm 21 instead of being fixedly mounted can be adapted for axial adjustment by suitable means (not shown). The arm projects over one extremity of, for example, trunnion 11 and into a slot 22 of a cap member 23 which engages the trunnion extremity preferably by suitable screw threads. The arm is interposed between balls 24 and 25, the centers of which are in coincidence with the trunnion axes. Ball 24 is arranged in a recess in said trunnion extremity, and ball 25 is mounted in a recess in a screw member 26 which is axially shiftable within the outer portion of cap member 23. A slot 26a is provided in the screw member for enabling axial adjustment thereof. By tightening or loosening the screw, the axial play of arm 21 is governed; the play should be as small as possible commensurate with a substantially frictionless engagement of the arm and balls.

It is understood that the above embodiment is to be employed in structures wherein the range of angular rotation of the rotatable element is approximately 360°, i. e. slightly less than 180° on either side of the central position as shown in Fig. 1.

A second embodiment is shown in Fig. 2 which illustrates means for absorbing axial thrusts of a rotatable element, the latter being adapted for free rotation within no predetermined angular limits. In this embodiment, to the extremity of one of the trunnions is attached, for example by a threaded engagement, a finger 27 which is coaxial with the trunnion and provided with a groove 27a which is adapted for receiving two groups of balls 28 and 29, each group being adjacent a wall of the groove. Suitable means (not shown) are provided for retaining the balls in position. Interposed between the ball groups is an axial thrust absorbing arm 30 which is mounted in a manner similar to arm 21. Means are provided for adjusting the distance between the walls or shoulders of the groove comprising, for example, a threaded cap member 31 which may be removed from the outer finger extremity to facilitate removal of the ball groups.

There is thus provided novel means for absorbing axial thrusts of a rotatable element, which means operate with a minimum amount of friction and which enable desired and accurate adjustments of axial play to be made. The device is simple in construction, light in weight, and requires but a small amount of space. It is therefore well adapted for use aboard vehicles such as aircraft.

Although only two embodiments of the invention have been illustrated and described in detail, it is to be expressly understood that the invention is not limited thereto. For example, instead of employing one ball on either side of arm 21 as in Fig. 1, more than one may be used, the balls being arranged upon the trunnion axis or arranged around it. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class described, a rotatable element, ball bearings for said element having an inner race and an outer race, one of said races having a continuous cylindrical surface, and an axial thrust bearing having balls coaxial with the center line of said element, said balls being operatively associated with an axial thrust member.

2. In apparatus of the class described, a rotatable element mounted upon a support, radial thrust ball bearings for said element having an inner race and an outer race for the balls thereof, one of said races having a continuous cylindrical surface, a pair of balls mounted upon said element coaxial therewith, a thrust arm interposed between said balls, the arm being mounted upon the support, and means for governing the distance between the balls and the support.

JOHANNES GOERTH.